(12) United States Patent
Kattepur et al.

(10) Patent No.: US 11,429,875 B2
(45) Date of Patent: Aug. 30, 2022

(54) METHOD AND SYSTEM FOR HIERARCHICAL DECOMPOSITION OF TASKS AND ACTION PLANNING IN A ROBOTIC NETWORK

(71) Applicant: Tata Consultancy Services Limited, Mumbai (IN)

(72) Inventors: Ajay Kattepur, Bangalore (IN); Sounak Dey, Kolkata (IN); Balamuralidhar Purushothaman, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 670 days.

(21) Appl. No.: 16/460,531

(22) Filed: Jul. 2, 2019

(65) Prior Publication Data

US 2020/0005162 A1    Jan. 2, 2020

(30) Foreign Application Priority Data

Jul. 2, 2018    (IN) .............................. 201821024658

(51) Int. Cl.
  *G06F 16/2455*   (2019.01)
  *G06N 5/02*      (2006.01)
  *G05B 19/4155*   (2006.01)

(52) U.S. Cl.
  CPC ........... *G06N 5/02* (2013.01); *G05B 19/4155* (2013.01); *G06F 16/2455* (2019.01); *G05B 2219/40113* (2013.01)

(58) Field of Classification Search
  CPC ................. G06N 5/02; G05B 19/4155; G05B 2219/40113; G05B 2219/39536; G06F 16/2455; B25J 9/1612
  See application file for complete search history.

(56) References Cited

U.S. PATENT DOCUMENTS

| | | | |
|---|---|---|---|
| 9,671,777 B1* | 6/2017 | Aichele | B25J 9/1666 |
| 9,873,199 B2* | 1/2018 | Wellman | B65G 1/10 |
| 9,926,138 B1* | 3/2018 | Brazeau | B25J 5/007 |
| 10,754,318 B2* | 8/2020 | Nagarajan | B25J 9/161 |
| 11,097,418 B2* | 8/2021 | Nagarajan | B25J 9/1612 |

(Continued)

OTHER PUBLICATIONS

Romay et al., "Template-Based Manipulation in Unstructured Environments for Supervised Semi-Autonomous Humanoid Robots," Nov. 18-20, 2014, pp. 979-986 (Year: 2014).*

*Primary Examiner* — Jorge A Casanova
(74) *Attorney, Agent, or Firm* — Finnegan, Henderson, Farabow, Garrett & Dunner LLP

(57) ABSTRACT

This disclosure relates generally to robotic network, and more particularly to a method and system for hierarchical decomposition of tasks and task planning in a robotic network. While a centralized system is used for action planning in a robotic network, any communication network issues can adversely affect working of the robotic network. Further, hardcoding one or more specific tasks to a robot restricts use of the robots irrespective of capabilities of the robots. The robotic agent decomposes a goal assigned to the robot to multiple sub-goals, and for each sub-goal, identifies one or more tasks to be executed/performed by the robot. An action plan is generated based on all such tasks identified, and the robot executes the action plan, in response to the goal assigned to the robot.

18 Claims, 5 Drawing Sheets

(56) References Cited

U.S. PATENT DOCUMENTS

| | | | |
|---|---|---|---|
| 2016/0195400 A1* | 7/2016 | Young | G01C 21/3848 |
| | | | 701/409 |
| 2017/0106532 A1* | 4/2017 | Wellman | B25J 9/1602 |
| 2018/0043532 A1 | 2/2018 | Lection et al. | |
| 2019/0217470 A1* | 7/2019 | Wang | B25J 9/1671 |
| 2019/0271547 A1* | 9/2019 | Young | G01C 21/165 |

* cited by examiner

METHOD AND SYSTEM FOR HIERARCHICAL DECOMPOSITION OF TASKS AND ACTION PLANNING IN A ROBOTIC NETWORK

PRIORITY CLAIM

This U.S. patent application claims priority under 35 U.S.C. § 119 to: India Application No. 201821024658, filed on 2 Jul. 2018. The entire contents of the aforementioned application are incorporated herein by reference.

TECHNICAL FIELD

This disclosure relates generally to robotic network, and more particularly to a method and system for hierarchical decomposition of tasks and task planning in a robotic network.

BACKGROUND

Advancements in domains such as robotics, artificial intelligence, and so on, have backed industrial automation. As part of industrial automation, initially computers were being used to aid users with data processing and decision making. However, new generation computers having advanced data processing capabilities have almost replaced human beings. Similarly, robots with specific capabilities are used to handle specific tasks. For example, in inventory management applications, robots are used for various operations such as but not limited to fetch product(s) from racks, placing products on racks, and delivering products to customers.

Such industry automation systems that use robots for handling various activities include one or more data processing and decision making units, which are used to process data and generate appropriate action plans which in turn are used to control activities/functions being handled by the robots.

The inventors here have recognized several technical problems with such conventional systems, as explained below. Such systems that are currently available typically deploy robots with specific capability to handle specific tasks. In that case, algorithms and data to handle specific tasks are hardcoded to robots, which may limit use of the robot even though it is capable of handling other tasks. From a resource management perspective, such an implementation has a disadvantage that a robot designated to handle a specific task cannot be used to handle another task, even though the robot is available for use and has hardware capabilities to handle the other task.

SUMMARY

Embodiments of the present disclosure present technological improvements as solutions to one or more of the above-mentioned technical problems recognized by the inventors in conventional systems. For example, in one embodiment, a processor-implemented method for action planning in a robotic network is provided. A robot that is part of the robotic network is assigned at least one goal, via one or more hardware processors. Upon receiving the at least one goal, by using a robotic agent of the robot decomposes the at least one goal to a plurality of sub-goals, via the one or more hardware processors. Further, each of the plurality of sub-goals is processed using the robotic agent, wherein processing of the sub-goal by the robotic agent involves: identifying at least one target and at least one action on the target, as requirements corresponding to the sub-goal; identifying a plurality of attributes corresponding to the at least one target; identifying a set of attributes corresponding to the at least one action; determining capability of the at least one robot, by querying a robot capability knowledge base; and generating an action plan corresponding to the collected at least one goal, based on 1. the plurality of attributes corresponding to the at least one action, 2. the set of attributes corresponding to the at least one target, 3. the determined capability of the robot, 4. data pertaining to environment in which the at least one robot is functioning, and 5. data pertaining to an algorithm to be executed by the at least one robot for executing the action plan. Identifying the plurality of attributes corresponding to the at least one action and the at least one target by the robotic agent involves: fetching said plurality of attributes from a local database of the at least one robot, if said plurality of attributes are available in the local database; fetching said plurality of attributes from a global database of the at least one robot, if said plurality of attributes are not available in the local database of the robot, and are available in the global database; and obtaining said plurality of attributes dynamically based on at least one real-time input obtained based on perception of the at least one robot.

In another embodiment, a robotic agent for action planning in a robotic network is provided. The robotic agent includes a memory module storing a plurality of instructions; one or more communication interfaces; and one or more hardware processors. The one or more hardware processors are coupled to the memory module via the one or more communication interfaces, wherein the one or more hardware processors are configured by the instructions to collect data pertaining to at least one goal that has been assigned to a robot with which the robotic agent is associated. The at least one goal is then decomposed to a plurality of sub-goals. Each sub-goal is then processed by the robotic agent, wherein processing of the sub-goal includes: identifying at least one target and at least one action on the target, as requirements corresponding to the sub-goal; identifying a plurality of attributes corresponding to the at least one target; identifying a set of attributes corresponding to the at least one action; determining capability of the at least one robot, by querying a robot capability knowledge base; and generating an action plan corresponding to the collected at least one goal, based on 1. the plurality of attributes corresponding to the at least one action, 2. the set of attributes corresponding to the at least one target, 3. the determined capability of the robot, 4. data pertaining to environment in which the at least one robot is functioning, and 5. data pertaining to an algorithm to be executed by the at least one robot for executing the action plan. Identifying the plurality of attributes corresponding to the at least one action and the at least one target by the robotic agent involves: fetching said plurality of attributes from a local database of the at least one robot, if said plurality of attributes are available in the local database; fetching said plurality of attributes from a global database of the at least one robot, if said plurality of attributes are not available in the local database of the robot, and are available in the global database; and obtaining said plurality of attributes dynamically based on at least one real-time input obtained based on perception of the at least one robot.

In yet another embodiment, a non-transitory computer readable medium for action planning in a robotic network is provided. The non-transitory computer readable medium, using a robotic agent associated with a robot in the robotic network, performs action planning for a robot that is part of the robotic network, and generates an action plan corresponding to at least one goal that has been assigned to the robot. Upon receiving the at least one goal, the robotic agent decomposes the at least one goal to a plurality of sub-goals, via the one or more hardware processors. Further, each of the plurality of sub-goals is processed using the robotic agent, wherein processing of the sub-goal by the robotic agent involves: identifying at least one target and at least one action on the target, as requirements corresponding to the sub-goal; identifying a plurality of attributes corresponding to the at least one target; identifying a set of attributes corresponding to the at least one action; determining capability of the at least one robot, by querying a robot capability knowledge base; and generating an action plan corresponding to the collected at least one goal, based on 1. the plurality of attributes corresponding to the at least one action, 2. the plurality of attributes corresponding to the at least one target, 3. the determined capability of the robot, 4. data pertaining to environment in which the at least one robot is functioning, and 5. data pertaining to an algorithm to be executed by the at least one robot for executing the action plan. Identifying the plurality of attributes corresponding to the at least one action and the at least one target by the robotic agent involves: fetching said plurality of attributes from a local database of the at least one robot, if said plurality of attributes are available in the local database; fetching said plurality of attributes from a global database of the at least one robot, if said plurality of attributes are not available in the local database of the robot, and are available in the global database; and obtaining said plurality of attributes dynamically based on at least one real-time input obtained based on perception of the at least one robot.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
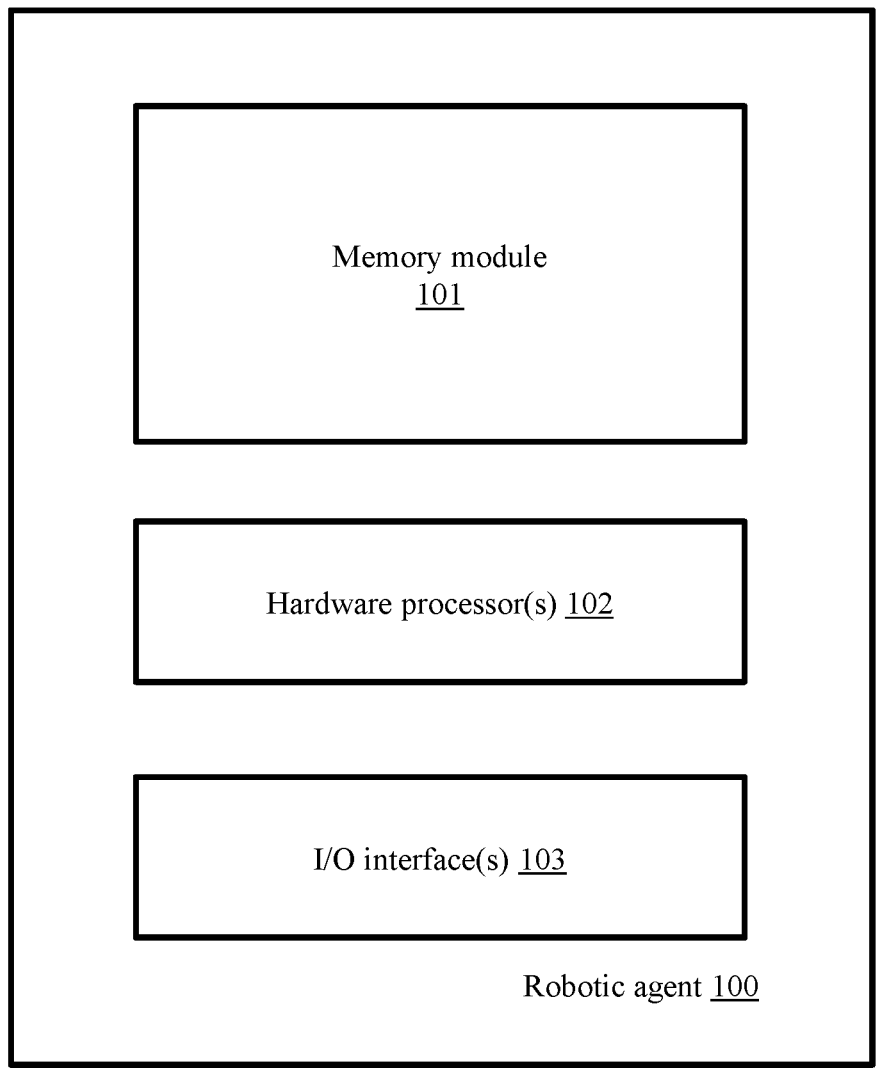
FIG. 1 illustrates an exemplary robotic agent for action planning in a robotic network, according to some embodiments of the present disclosure.

FIG. 1 illustrates an exemplary robotic agent for action planning in a robotic network, according to some embodiments of the present disclosure. In an embodiment, the robotic agent 100 includes one or more hardware processors 102, communication interface(s) or input/output (I/O) interface(s) 103, and one or more data storage devices or memory module 101 operatively coupled to the one or more hardware processors 102. The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the robotic agent 100 can be implemented in a variety of computing systems, such as laptop computers, notebooks, hand-held devices, workstations, mainframe computers, servers, a network cloud and the like.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the robotic agent 100 can be stored in the memory 101.

The robotic agent 100 maybe realized as a module that may be used as an internal and/or external component of each robot of the robotic network. The robotic agent 100 provides the robots, capability to work as an independent unit that can 1. decompose multiple sub-goals corresponding to one or more goals assigned to the robot, 2. identify at least one action and at least one target, 3. obtain data pertaining to one or more attributes of the identified at least one action and at least one target, 4. identify capability of the robot (in terms of at least one specification of the robot), and 5. generate an action plan corresponding to the one or more goals. The robotic agent 100 may query a global database that stores various types of data required for the data planning. In an embodiment, the global database may be stored in a centralized system with which all robots in the robotic network are communicating with. The centralized system may be accessed by one or more authorized users to assign goal(s) to the robots, and the users may be able to track progress while the robot(s) is executing one or more actions in response to the assigned goal(s).

Figure 2:
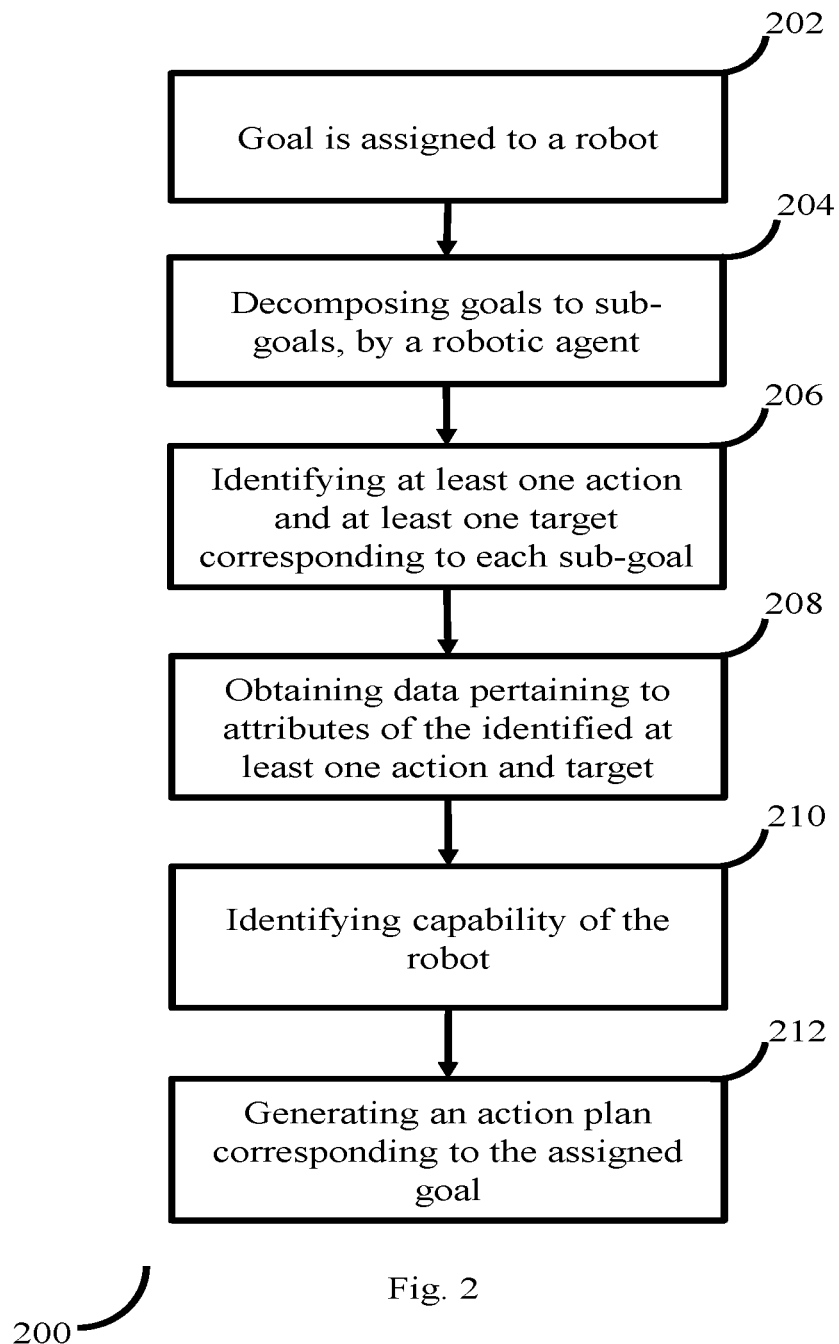
FIG. 2 is a flow diagram depicting steps involved in the process of generating an action plan in the robotic network, using the robotic agent of FIG. 1, according to some embodiments of the present disclosure.

FIG. 2 is a flow diagram depicting steps involved in the process of generating an action plan in the robotic network, using the robotic agent of FIG. 1, according to some embodiments of the present disclosure.

Figure 4:
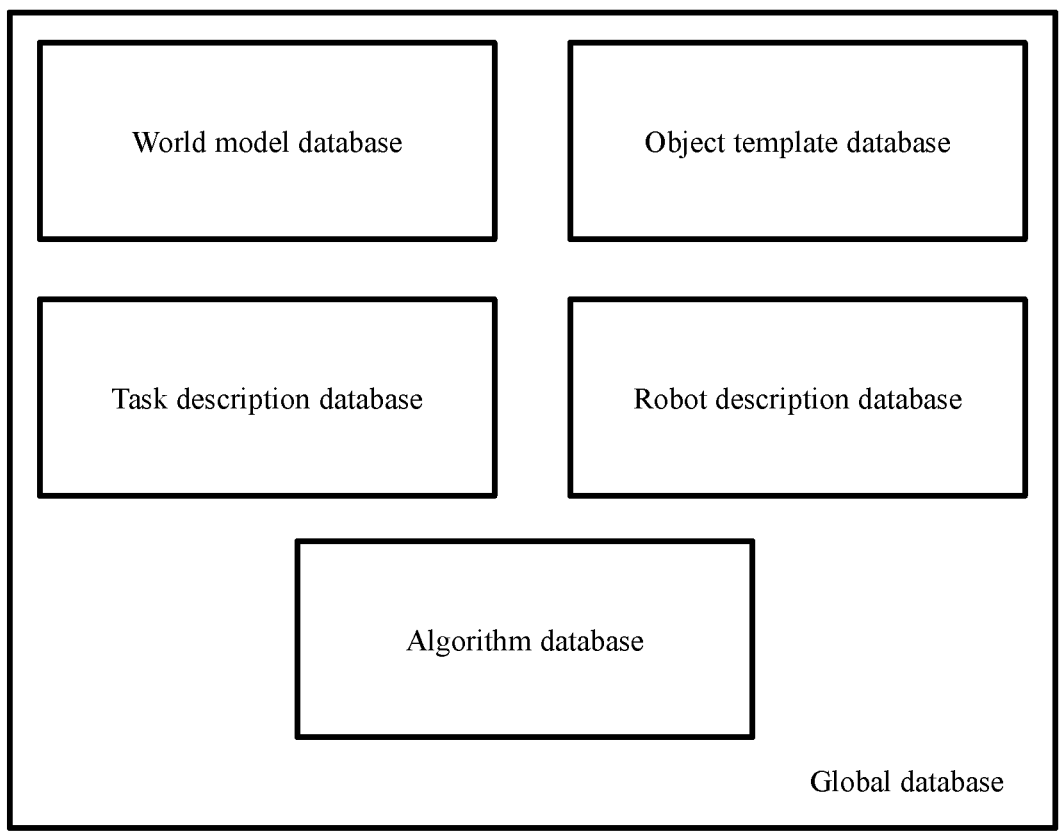
FIG. 4 depicts components of a global database being used by the robotic agent of FIG. 1, for the action planning, according to some embodiments of the present disclosure.

Robotic agent 100 in each robot in the robotic network requires specific data with respect to goals assigned, tasks to be executed, environment (refers to location and path(s) through which the robots need to maneuver and move around to execute one or more tasks, position of a target (including location, raw number, column number and so on in case the robot is used for picking an item/product when used for inventory management purpose)), capabilities of the robot, and so on, for action planning. A global database is maintained in a one or more databases, which may be internal or external to the robotic agent 100, which is used to store at least the data of the aforementioned types. As depicted in FIG. 4, data is arranged/organized in the global database as comprising a world model database, an object template database, a task description database, a robot description database, and an algorithm database.

The world model database stores data (ontologies) pertaining to environment map, facility description, and a plurality of updated point cloud templates. If the robot is deployed inside a closed environment (a warehouse for example) for picking products from storage spaces in the warehouse, then the world model database stores a map of the warehouse, facility description (comprising details such as area to cover (in sqft for example), structures/obstructions inside the warehouse, position of racks within the warehouse and so on), and so on.

The object template database stores ontologies specific to object descriptions, features, and templates matching each of the objects. For example, considering the warehouse example given above, object description and features represents characteristics (such as type, color, size and so on) of each of the products stored in the warehouse which the robot has to fetch.

The task description database describes tasks in terms of actions the robot has to perform. Such task descriptions are further mapped to features of the environment and one or more targets (objects). For example, the task description may be turn left ☐ move forward by certain distance ☐ stretch robotic arm ☐ fetch the target and so on.

The robot description database stores data (ontologies) pertaining to a plurality of characteristics and capabilities of the robot. Robots that form the robotic network maybe of different models and type, each type having specific capabilities. In an embodiment, the capabilities of the robot may be identified in terms of at least one specification/characteristics (some of which are given in the examples below) of the robot. For example, a robot deployed in a warehouse may have capabilities to move around, extent arms, fetch objects, and drop/place objects in designated places, whereas capabilities of a robot used for surveillance purpose may include ability to move around, use appropriate scanning modes (infrared, thermal view and so on), record audio and/or video, object identification capabilities and so on. The robot description database may further store data pertaining to specifications of the robot, such as but not limited to turning radius of the robot, weight carrying capacity and so on.

The algorithm database is used to store one or more algorithms that may be used by the robots so as to execute one or more tasks. For example, an algorithm for path planning maybe stored in the algorithm database, which any robot may execute for route planning when the robot has to move from one point to another. Similarly other algorithms such as an image processing algorithm, a pick and place algorithm and so on can be stored in the algorithm database, based on goals robots in the robotic network are to handle. Similarly the algorithm database stores one or more perception algorithms, which can be invoked and executed by the robotic agent to trigger perceptions of the robot so as to collect required data. Further, the global database and one or more of the corresponding local databases get updated each time the robots in the robotic network fetches a new data as part of the action planning and/or when robotic agent of a robot performs action planning. An authorized user also may update one or more of the databases, by feeding new data or by modifying existing data, using appropriate user interfaces provided.

Information/data stored in the global database is used for a hierarchical task decomposition during the action planning by the robotic agent. The global database can be configured to provide database provides data to more than one robots simultaneously, upon receiving data request from the robots. For example, when the robotic network uses multiple robots, which may be in the same or different locations, to coordinate an activity, all the robots may query the global database at the same time, and the global database serves all the requests at the same time or in an orderly fashion. In an alternate embodiment, if the global database is located in a centralized location, multiple local databases which store subsets/all of data in the global database maybe generated, each being stored in robotic agents of each robot in the robotic network. This allows the robotic agents to query and obtain data from the local database, which may be faster as compared to querying and obtaining data from the global database. Further, even if connection with the global database is interrupted due to network issues or any other reason, the robots may still be able to function as the data required for action planning is available in the local database.

Figure 5:
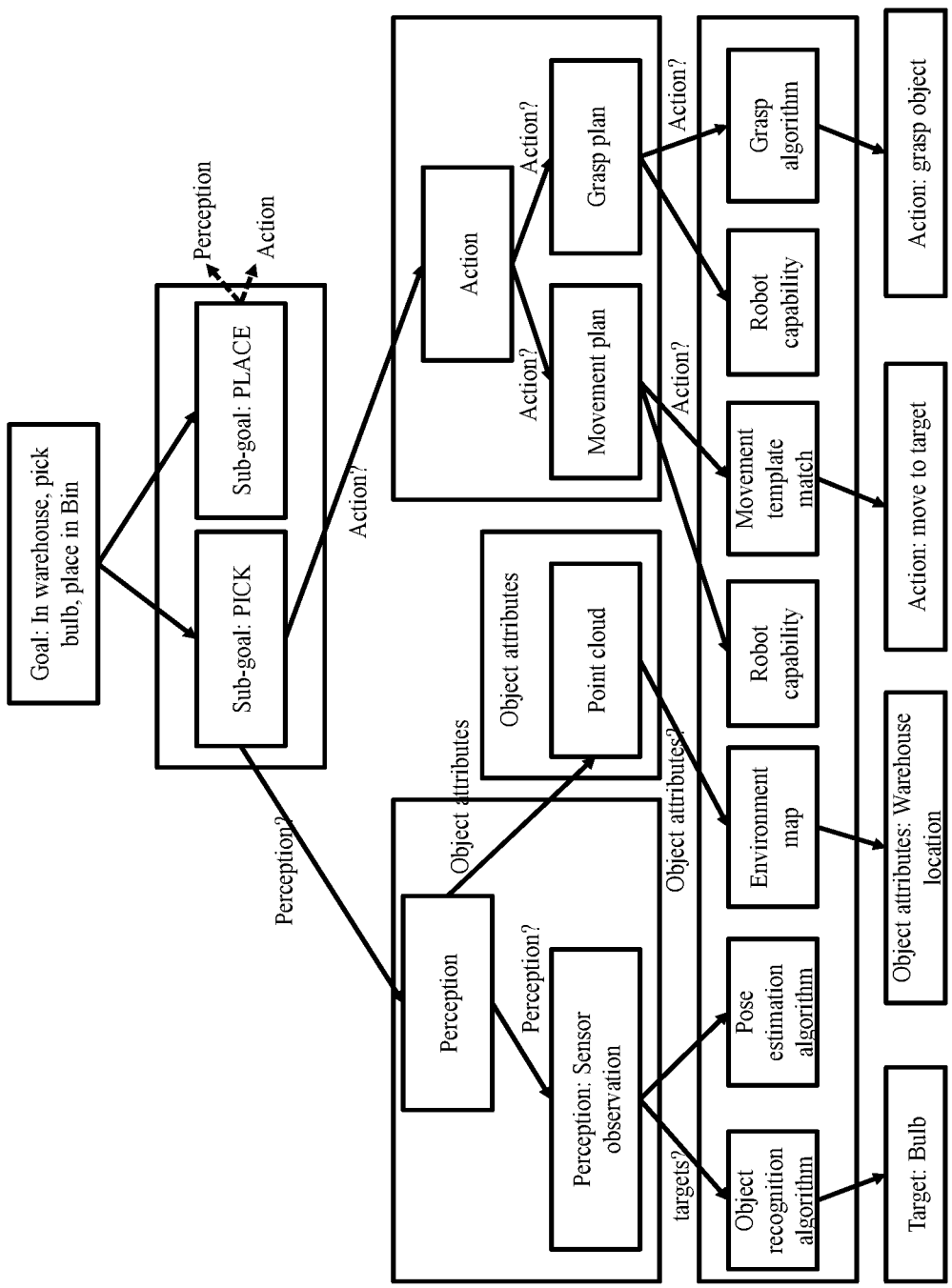
FIG. 5 depicts an example scenario in which action planning is performed by the robotic agent of FIG. 1, according to some embodiments of the present disclosure.

By using an appropriate user interface, a user can assign (202) one or more goals to one or more robots from a plurality of robots that form the robotic network. The action planning is explained by considering one robot and one goal assigned to that robot. However, this is for explanation purpose only, and does not intent to restrict scope of the present disclosure in any manner. Further, for better understanding, the method of FIG. 2 is explained by taking the warehouse scenario depicted in FIG. 5 as an example. The goal assigned to the robot is 'pick bulb, place in bin' in a warehouse as depicted in FIG. 5.

The robotic agent 100 of the robot decomposes (204) the goal to a plurality of sub-goals i.e. PICK and PLACE. The robotic agent 100 further processes each sub-goal separately, and identifies (206) at least one action and at least one target corresponding to each sub-goal. In the example depicted in FIG. 5, the target is the bulb, and the actions are picking and placing the bulb in the bin. The robotic agent 100 further requires data pertaining to different attributes of the bulb so as to identify the target, and also the data pertaining to location of the bulb in the warehouse for the robot to approach the target. Similarly, actions in the scenario involves the robot moving towards the target and approaching the target, and grasping the bulb so as to pick and place it in the bin. The robotic agent 100 requires data pertaining to different attributes with respect to the 'actions' so as to perform the action planning.

In an embodiment, the robotic agent 100 queries at least one of the local database and global database to fetch data pertaining to the attributes of the identified at least one 'action' and 'target'. If required data is not found in the local and global databases, then the robotic agent 100 invokes/triggers perception(s) of the robot to collect/fetch real-time inputs pertaining to various attributes of the 'action' and 'target'. When perceptions are triggered, appropriate sensors associated with the robot are used to monitor and fetch data pertaining to the various attributes.

After obtaining (208) the data pertaining to a plurality of attributes of the identified at least one target and the set of attributes of the identified at least one action, the robotic agent identifies (210) at least one capability of the robot, by querying a robot capability knowledge base. Further, the data pertaining to the attributes of the at least one target, at least one action, robot capabilities, location, and so on, are processed by picking at least one appropriate algorithm from the local/global database, and an action plan is generated corresponding to the assigned goal. In the aforementioned example, the target is bulb, object attribute generated is warehouse location (of the bulb), one action is 'robot moving towards the bulb', and another action is 'robot grasping the bulb' using a robotic arm (grasping being one of the identified capabilities of the robot.). An action plan comprising details with respect to one or more tasks to be executed by the robot corresponding to the aforementioned actions is then generated (212) by the robotic agent 100, based on (i) the set of attributes corresponding to the at least one action, (ii) the plurality of attributes corresponding to the at least one target, (iii) the determined capability of the robot, (iv) data pertaining to environment in which the at least one robot is functioning, and (v) data pertaining to an algorithm to be executed by the at least one robot for executing the action plan.

The robotic agent 100 represents the action plan that has been decomposed to sub-goals, actions, and tasks, in the form of a tree (T), comprising 'n' number of nodes (T1, T2, . . . Tn). The tree T further represents a hierarchical decomposition of tasks, corresponding to a goal assigned to the robot. The goal assigned to the robot may form root (r) of the tree, and the branches represent sub-goals, actions, and tasks. The robotic agent 100 may be further configured to follow a defined path for traversal among the tree nodes, for execution of the tasks. An example of the tree traversal is given below:

Pre-order traversal: visit node, visit left sub-tree, visit right sub-tree

Post-order traversal: visit left sub-tree, visit node, visit right sub-tree

The tree traversal order is planned such that the robotic agent 100 gets necessary data for the action planning, at each stage.

The robot may be assigned a different goal, and in that case, the action planning process elaborated above is executed by the robot to perform action planning and in turn to execute one or more actions corresponding to the assigned goal. This makes the robot suitable for handling different goals (which matches capabilities of the robot). In various embodiments, one or more of the steps in method 200 may be performed in the same order or in a different order. Further, one or more of the steps in method 200 may be omitted.

Figure 3:
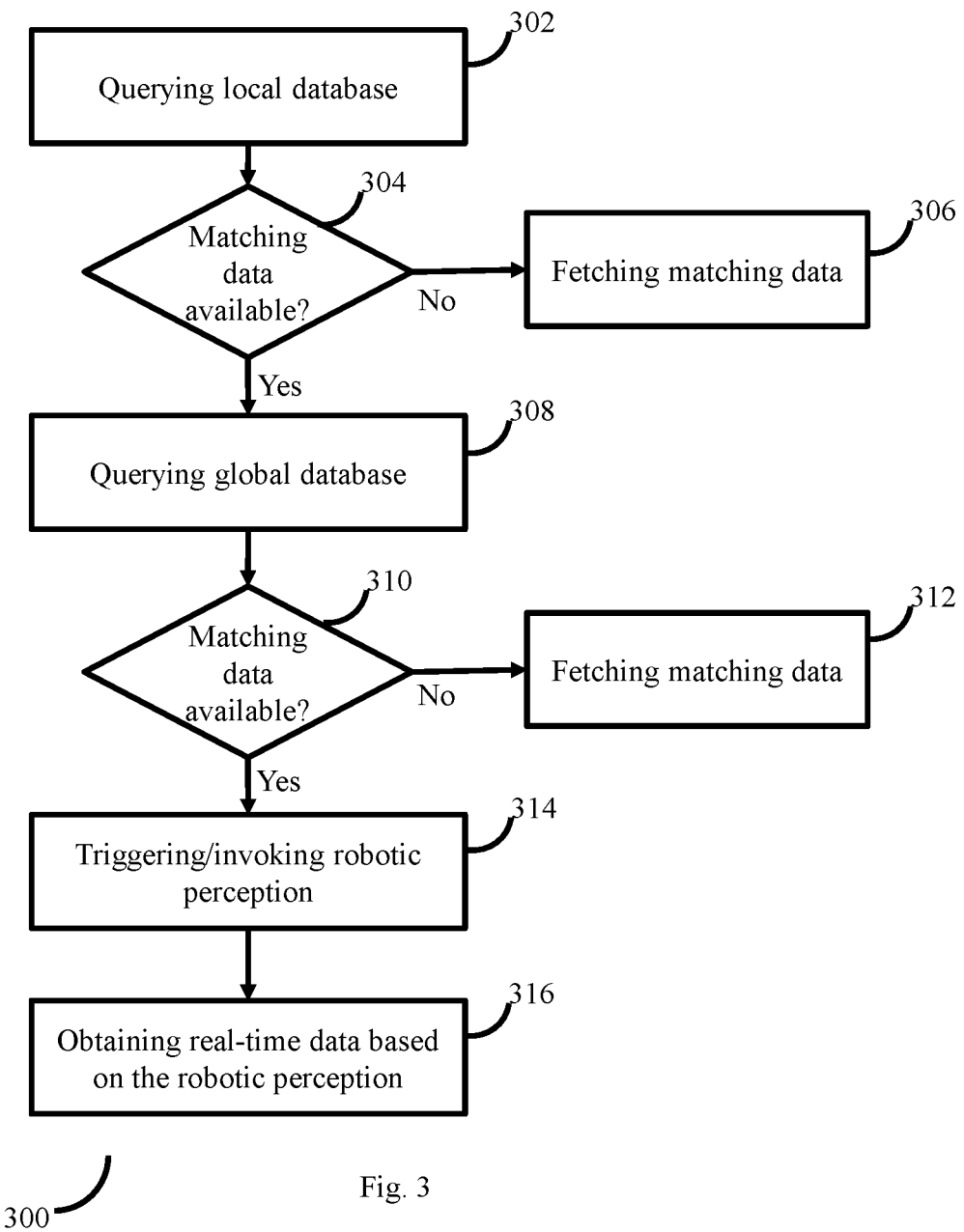
FIG. 3 is a flow diagram depicting steps involved in the process of fetching data pertaining to attributes of action and target corresponding to an assigned goal, by the robotic agent of FIG. 1, in accordance with some embodiments of the present disclosure.

FIG. 3 is a flow diagram depicting steps involved in the process of fetching data pertaining to attributes of action and target corresponding to an assigned goal, by the robotic agent of FIG. 1, in accordance with some embodiments of the present disclosure. In order to collect/fetch data pertaining to various attributes of the one or more actions and the one or more targets, the robotic agent 100 initially queries (302) a local database. The local database may or may not have all data required by the robotic agent 100. If the required data (i.e., data matching one or more of the requirements of the robotic agent 100) is available in the local database, then the robotic agent 100 fetches (306) the data from the local database. If matching contents/data are not found in the local database, then the robotic agent 100 queries (308) the global database. If data matching one or more of the requirements of the robotic agent 100 are available in the global database, then the robotic agent 100 fetches (312) the data from the global database. If matching contents/data are not found in the local database, then the robotic agent 100 triggers/invokes (314) one or more robotic perceptions, which results in the robot obtaining (316) real-time data pertaining to all or part of the required data (which has not been found in the local and global databases), using one or more appropriate sensors or similar input modules. In various embodiments, one or more of the steps in method 300 may be performed in the same order or in a different order. Further, one or more of the steps in method 300 may be omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for hierarchical decomposition of tasks and action planning in a robotic network, comprising:
assigning at least one goal to at least one robot in the robotic network, via one or more hardware processors;
collecting the assigned at least one goal, via the one or more hardware processors, by a robotic agent of the at least one robot;
decomposing the at least one goal into a plurality of sub-goals, via the one or more hardware processors, by the robotic agent, wherein the robotic agent comprises a global database, wherein the global database comprises:
one or more point cloud templates,
mapping of task descriptions of the decomposed plurality of sub-goals with features of an environment in which the at least one robot is functioning,
a robot model of the at least one robot, and
a specification that indicates one or more capability of the at least one robot to perform the at least one goal;
for each sub-goal of the plurality of sub-goals:
identifying at least one target and at least one action on the at least one target, as requirements corresponding to a sub-goal of the plurality of sub-goals;
identifying a plurality of attributes corresponding to the at least one target, wherein the identification of said plurality of attributes comprises:
fetching said plurality of attributes from a local database of the at least one robot based on availability of said plurality of attributes in the local database;
fetching said plurality of attributes from the global database of the at least one robot based on:
unavailability of said plurality of attributes in the local database of the at least one robot, and
the availability of said plurality of attributes in the global database; and
obtaining at least one first real-time input based on perception of the at least one robot;
obtaining said plurality of attributes dynamically based on the obtained at least one first real-time input;
identifying a set of attributes corresponding to the at least one action, wherein the identification of said set of attributes comprises:
fetching said set of attributes from the local database of the at least one robot based on availability of said set of attributes in the local database;
fetching said set of attributes from the global database of the at least one robot based on:
unavailability of said set of attributes in the local database of the at least one robot, and
the availability of said set of attributes in the global database; and
obtaining at least one second real-time input based on perception of the at least one robot and the unavailability of said set of attributes in each of the local database and the global database;
obtaining said set of attributes dynamically based on the obtained at least one second real-time input;
determining capability of the at least one robot, wherein the capability is in terms of at least one specification of the at least one robot, by querying a robot capability knowledge base;
generating an action plan corresponding to the collected at least one goal, based on (i) the set of attributes corresponding to the at least one action, (ii) the plurality of attributes corresponding to the at least one target, (iii) the determined capability of the at least one robot, (iv) data pertaining to the environment in which the at least one robot is deployed, and (v) data pertaining to at least one algorithm to be executed by the at least one robot for executing the action plan; and
updating the global database and the local database based on fetch of new data by a plurality of robots in the robotic network, wherein the new data is fetched by the plurality of robots as part of the action plan of the plurality of robots.

2. The method as claimed in claim 1, wherein the plurality of attributes corresponding to the at least one target comprises at least one object attribute representing at least one characteristic of the at least one target.

3. The method as claimed in claim 1, wherein the set of attributes corresponding to the at least one action comprises a navigation plan and a manipulation plan.

4. The method as claimed in claim 3, wherein the navigation plan is used for the at least one robot to reach the at least one target.

5. The method as claimed in claim 3, wherein the manipulation plan comprises data pertaining to the at least one action to be performed on the at least one target, by the at least one robot.

6. The method as claimed in claim 1, wherein the global database comprises:
i. a world model database comprising: 1) an environment map and 2) data pertaining to facility description;
ii. an object template database comprising data pertaining to 1) object description of one or more objects, 2) at least one feature and at least one template describing one or more characteristics of the one or more objects;
iii. task description database, comprising data pertaining to data pertaining to description of one or more tasks;
iv. robot description database comprising data pertaining to one or more components of the at least one robot; and
v. data pertaining to one or more algorithms to be executed as part of handling one or more goals by the at least one robot.

7. A robotic agent for hierarchical decomposition of tasks and action planning in a robotic network, comprising:
a memory storing a plurality of instructions;
one or more communication interfaces; and
one or more hardware processors coupled to the memory via the one or more communication interfaces, wherein the one or more hardware processors are configured by the plurality of instructions to:
collect data pertaining to at least one goal that has been assigned to at least one robot with which the robotic agent is associated, wherein the at least one robot is in a robotic network;
decompose the at least one goal into a plurality of sub-goals, wherein the robotic agent comprises a global database, wherein the global database comprises:
one or more point cloud templates,
mapping of task descriptions of the decomposed plurality of sub-goals with features of an environment in which the at least one robot is functioning,
a robot model of the at least one robot, and
a specification that indicates one or more capability of the at least one robot to perform the at least one goal;
for each sub-goal of the plurality of sub-goals:
identify at least one target and at least one action on the at least one target, as requirements corresponding to a sub-goal of the plurality of sub-goals;

identify a plurality of attributes corresponding to the at least one target, wherein the identification of said plurality of attributes comprises:
fetching said plurality of attributes from a local database of the at least one robot based on availability of said plurality of attributes in the local database;
fetching said plurality of attributes from the global database of the at least one robot based on:
unavailability of said plurality of attributes in the local database of the robot, and
the availability of said plurality of attributes in the global database; and
obtaining at least one first real-time input based on perception of the at least one robot:
obtaining said plurality of attributes dynamically based on the at least first one real-time input;
identify a set of attributes corresponding to the at least one action, wherein the identification of said set of attributes comprises:
fetching said set of attributes from the local database of the at least one robot based on availability of said set of attributes in the local database;
fetching said set of attributes from the global database of the at least one robot based on:
unavailability of said set of attributes in the local database of the robot, and
the availability of said set of attributes in the global database; and
obtaining at least one second real-time input based on perception of the at least one robot and the unavailability of said set of attributes in each of the local database and the global database;
obtaining said set of attributes dynamically based on the obtained at least second one real-time input;
determine capability of the at least one robot, wherein the capability is in terms of at least one specification of the at least one robot, by querying a robot capability knowledge base; and
generate an action plan corresponding to the collected at least one goal, based on (i) the set of attributes corresponding to the at least one action, (ii) the plurality of attributes corresponding to the at least one target, (iii) the determined capability of the robot, (iv) data pertaining to the environment in which the at least one robot is deployed, and (v) data pertaining to at least one algorithm to be executed by the at least one robot for executing the action plan; and
update the global database and the local database based on fetch of new data by a plurality of robots in the robotic network, wherein the new data is fetched by the plurality of robots as part of the action plan of the plurality of robots.

8. The robotic agent as claimed in claim 7, wherein the one or more hardware processors are further configured to identify at least one object attribute representing at least one characteristic of the at least one target as the plurality of attributes corresponding to the at least one target.

9. The robotic agent as claimed in claim 7, wherein the one or more hardware processors are further configured to identify a navigation plan and a manipulation plan as the set of attributes corresponding to the at least one action.

10. The robotic agent as claimed in claim 9, wherein the one or more hardware processors are further configured to use the navigation plan to navigate the at least one robot to reach the at least one target.

11. The robotic agent as claimed in claim 9, wherein the one or more hardware processors are configured to execute the at least one action on the at least one target using the at least one robot, based on the manipulation plan.

12. The robotic agent as claimed in claim 7, wherein the global database comprises:
i. a world model database comprising: 1) an environment map 2) data pertaining to facility description;
ii. an object template database comprising data pertaining to 1) object description of one or more objects, 2) at least one feature and at least one template describing one or more characteristics of the one or more objects;
iii. a task description database, comprising data pertaining to data pertaining to description of one or more tasks;
iv. a robot description database comprising data pertaining to one or more components of the robot; and
v. data pertaining to one or more algorithms to be executed as part of handling one or more goals by the at least one robot.

13. A non-transitory computer readable medium for hierarchical decomposition of tasks and action planning in a robotic network, comprising:
assigning at least one goal to at least one robot in the robotic network, via one or more hardware processors;
collecting the assigned at least one goal, via the one or more hardware processors, by a robotic agent of the at least one robot;
decomposing the at least one goal into a plurality of sub-goals, via the one or more hardware processors, by the robotic agent, wherein the robotic agent comprises a global database, wherein the global database comprises:
one or more point cloud templates,
mapping of task descriptions of the decomposed plurality of sub-goals with features of an environment in which the at least one robot is functioning,
a robot model of the at least one robot, and
a specification that indicates one or more capability of the at least one robot to perform the at least one goal;
for each sub-goal of the plurality of sub-goals:
identifying at least one target and at least one action on the at least one target, as requirements corresponding to a sub-goal of the plurality of sub-goals;
identifying a plurality of attributes corresponding to the at least one target, wherein the identification of said plurality of attributes comprises:
fetching said plurality of attributes from a local database of the at least one robot based on availability of said plurality of attributes in the local database;
fetching said plurality of attributes from global database of the at least one robot based on:
unavailability of said plurality of attributes in the local database of the at least one robot, and
the availability of said plurality of attributes in the global database; and
obtaining at least one first real-time input based on perception of the at least one robot;
obtaining said plurality of attributes dynamically based on the obtained at least one first real-time input;
identifying a set of attributes corresponding to the at least one action, wherein the identification of said set of attributes comprises:
fetching said set of attributes from the local database of the at least one robot based on unavailability of said set of attributes are available in the local database;
fetching said set of attributes from the global database of the at least one robot based on:

unavailability of said set of attributes are not available in the local database of the at least one robot, and the availability of said set of attributes in the global database; and obtaining at least one second real-time input based on perception of the at least one robot and the unavailability of said set of attributes in each of the local database and the global database;

obtaining said set of attributes dynamically based on the obtained at least one second real-time input;

determining capability of the at least one robot, wherein the capability is in terms of at least one specification of the at least one robot, by querying a robot capability knowledge base;

generating an action plan corresponding to the collected at least one goal, based on (i) the set of attributes corresponding to the at least one action, (ii) the plurality of attributes corresponding to the at least one target, (iii) the determined capability of the at least one robot, (iv) data pertaining to the environment in which the at least one robot is deployed, and (v) data pertaining to at least one algorithm to be executed by the at least one robot for executing the action plan; and updating the global database and the local database based on fetch of new data by a plurality of robots in the robotic network, wherein the new data is fetched by the plurality of robots as part of the action plan of the plurality of robots.

14. The non-transitory computer readable medium as claimed in claim 13, wherein the plurality of attributes corresponding to the at least one target comprises at least one object attribute representing at least one characteristic of the at least one target.

15. The non-transitory computer readable medium as claimed in claim 13, wherein the set of attributes corresponding to the at least one action comprises a navigation plan and a manipulation plan.

16. The non-transitory computer readable medium as claimed in claim 15, wherein the navigation plan is used for the at least one robot to reach the at least one target.

17. The non-transitory computer readable medium as claimed in claim 15, wherein the manipulation plan comprises data pertaining to the at least one action to be performed on the at least one target, by the at least one robot.

18. The non-transitory computer readable medium as claimed in claim 13, wherein the global database comprises:
  i. a world model database comprising: 1) an environment map 2) data pertaining to facility description;
  ii. an object template database comprising data pertaining to 1) object description of one or more objects, 2) at least one feature and at least one template describing one or more characteristics of the one or more objects;
  iii. task description database, comprising data pertaining to 1) data pertaining to description of one or more tasks;
  iv. robot description database comprising data pertaining to one or more components of the robot; and
  v. data pertaining to one or more algorithms to be executed as part of handling one or more goals by the at least one robot.

* * * * *